(12) United States Patent
Kunter

(10) Patent No.: US 7,353,703 B2
(45) Date of Patent: Apr. 8, 2008

(54) METHOD FOR DETECTING THE FUEL QUANTITY DURING THE REFUELING OF A MOTOR VEHICLE

(75) Inventor: Stefan Kunter, Hamburg (DE)

(73) Assignee: FAFNIR GmbH, Hamburg (DE)

( * ) Notice: Subject to any disclaimer, the term of this patent is extended or adjusted under 35 U.S.C. 154(b) by 96 days.

(21) Appl. No.: 11/334,563

(22) Filed: Jan. 19, 2006

(65) Prior Publication Data

US 2006/0169035 A1 Aug. 3, 2006

(30) Foreign Application Priority Data

Jan. 28, 2005 (DE) .................... 10 2005 004 138

(51) Int. Cl.
*G01F 17/00* (2006.01)
*G01F 15/02* (2006.01)

(52) U.S. Cl. ..................... 73/149; 73/861.01

(58) Field of Classification Search .................. 73/149, 73/861.01, 861.02, 861.03, 204.19; 235/94 A
See application file for complete search history.

(56) References Cited

U.S. PATENT DOCUMENTS

| | | | |
|---|---|---|---|
| 4,101,056 A | 7/1978 | Mattimoe et al. | 222/26 |
| 5,332,011 A * | 7/1994 | Spalding | 141/59 |
| 5,538,051 A * | 7/1996 | Brown et al. | 141/18 |
| 5,542,458 A | 8/1996 | Payne et al. | 141/7 |
| 5,557,084 A * | 9/1996 | Myers et al. | 235/94 A |
| 5,706,273 A | 1/1998 | Guerreri | 364/510 |
| 6,629,455 B2 | 10/2003 | Schrittenlacher et al. | 73/204.22 |
| 2006/0161374 A1* | 7/2006 | Hillam | 702/130 |

FOREIGN PATENT DOCUMENTS

| | | |
|---|---|---|
| DE | 100 31 813 A1 | 1/2002 |
| EP | 0 772 567 B1 | 5/1998 |
| EP | 0 933 619 A1 | 8/1999 |
| EP | 0 993 619 B1 | 4/2000 |

* cited by examiner

*Primary Examiner*—Hezron Williams
*Assistant Examiner*—John Fitzgerald
(74) *Attorney, Agent, or Firm*—Nixon & Vanderhye, PC

(57) ABSTRACT

In an example method for detecting the fuel quantity during the refueling of a motor vehicle, the volume of the fuel conducted to the motor vehicle during the refueling operation and the temperature of the fuel are measured. The measured volume is corrected to predetermined temperature conditions by means of the measured temperature, specifically in a monitoring unit for a gas recirculation device. Preferably, a retrofitting kit for a device for carrying out the method contains a temperature sensor and an accessory for the monitoring unit for the gas recirculation system.

19 Claims, 1 Drawing Sheet

METHOD FOR DETECTING THE FUEL QUANTITY DURING THE REFUELING OF A MOTOR VEHICLE

BACKGROUND AND SUMMARY

The invention relates to a method for detecting the fuel quantity during the refuelling of a motor vehicle.

When a motor vehicle is refuelled at a filling station, fuel is conveyed out of a storage tank through a fuel-volume flowmeter with the aid of a fuel pump and is conducted into the tank of the motor vehicle via a filling hose. The fuel-volume flowmeter (throughflow meter) emits pulses which are displayed, via a filling-column computer, as the volume which is being introduced into the tank of the motor vehicle.

In the prior art, therefore, the fuel quantity is displayed as a volume, even though the fuel would actually have to be sold according to weight (mass), since the volume of a given fuel quantity (mass) is not constant because of the temperature dependency of the density.

It is customary, in the calibration of filling columns, to relate the volume display to a predetermined temperature, as a rule to the average annual temperature of the fuel (which is mostly stored underground) in the respective country or region.

Since the density of hydrocarbons decreases with a rising temperature in the order of magnitude of 0.1% per degree, this being a relatively high temperature dependency, the fuel quantity sold according to the volume display during a refuelling operation may often deviate relatively sharply from the fuel mass actually introduced.

EP 0 772 567 B1 and EP 0 933 619 A1 disclose temperature-compensating fuel discharge devices, by means of which a temperature correction can be carried out on the measured fuel volume. In both instances, however, relatively complicated additional electronic components are required.

The object of the invention is to provide a possibility for the correct detection of the fuel quantity during the refuelling of a motor vehicle which can be implemented without costly additional components.

In the method according to the invention for detecting the fuel quantity during the refuelling of a motor vehicle, the volume of the fuel conducted to the motor vehicle during the refuelling operation is measured, which may take place in the conventional way with the aid of a fuel throughflow meter. Furthermore, the temperature of the fuel is measured, preferably in or on a fuel line which is arranged, for example, inside a filling column. The measured volume is corrected to predetermined temperature conditions by means of the measured temperature.

When the filling station is equipped with a gas recirculation system, as is prescribed in many countries, a monitoring unit for the gas recirculation system is located in a filling column. Monitoring systems of this type for gas recirculation are known, for example, from DE 100 31 813 A1. Within the framework of the method according to the invention, the correction steps are carried in the monitoring unit for the gas recirculation system. The advantage of this is that, in contrast to the previously known methods, there is no need for complicated additional electronic components to be installed in the filling column in order to take into account the temperature dependency of the fuel density, but, instead, the monitoring unit which is present in any case can be utilized in order to correct to predetermined temperature conditions.

When the monitoring unit is connected to a filling-column computer, fuel-volume pulses which are characteristic of the corrected volume are transmitted to the filling-column computer, preferably instead of fuel-volume pulses which are characteristic of the measured volume. These corrected fuel-volume pulses are in this case calculated and provided by the monitoring unit, so that the volume display generated by the filling-column computer corresponds to the corrected volume, without any changes having to be carried out on the filling-column computer.

During correction, preferably, the measured volume is multiplied by the quotient of the density of the fuel at the measured temperature and the density of the fuel at the predetermined temperature. Since the composition of the fuel is at least approximately known, the density may be gathered as a function of the temperature, for example, from a table which is stored in a monitoring unit serving as an evaluation unit. If, therefore, the temperature of the fuel is higher than the predetermined temperature (which, for example, coincides with the customary average annual temperature of the fuel), the density of the fuel is lower and the measured volume higher than corresponds to the mass of the fuel; without correction, therefore, the fuel would be sold too dearly. Opposite proportions prevail at low temperatures. The correction ensures that the volume displayed is a numerical value which is proportional to the actual mass of the fuel delivered. Preferably, during correction, correction is carried out to the temperature conditions on which pricing is based.

In an extension of the method according to the invention, the monitoring unit may additionally be utilized in order to correct the measured volume of the fuel according to gas quantity suction-extracted from the motor vehicle during the refuelling operation. Such a correction does not normally take place. Where hydrocarbons with their relatively high molecular weight are concerned, however, the mass of the fuel vapour which is sucked out of the tank of the motor vehicle by the gas recirculation system during a refuelling operation and is conducted into the storage tank of the filling station is no longer negligible. So that the customer no longer has to give this fuel vapour to the filling station free of charge, the invention affords the possibility of converting the gas volume flow measured during a refuelling operation when the gas recirculation system is in operation into a fuel mass (or continuously into a fuel mass flow) by means of the at least approximately known density of the fuel gas (which, if appropriate, may also be temperature-corrected). The volume display of the filling column can consequently be corrected in a similar way to that explained above in connection with temperature correction.

As already indicated, the correction steps are preferably carried out continuously during the refuelling operation, so that the volume display of a filling column indicates continuously corrected values which are proportional to the fuel quantity (fuel mass) actually introduced. It is also conceivable, however, to carry out the correction calculation only after the termination of the refuelling operation, in which case the volume display can still jump over to a corrected value or only the displayed selling price is changed.

In a device for carrying out the method according to the invention, a monitoring unit for a gas recirculation system is utilized in order to carry out the corrections, as explained. An existing installation can therefore be converted with the aid of a retrofitting kit in such a way that it is suitable for carrying out the method according to the invention. The retrofitting kit merely needs to contain a temperature sensor and an accessory for the monitoring unit. The accessory may require hardware arrangements, for example an interface for connecting the temperature sensor. Depending on the design of the existing monitoring unit, however, it is also conceivable to provide merely an upgrade of the software and/or of the firmware in the accessory. The conversion of an existing installation is therefore cost-effective.

BRIEF DESCRIPTION OF THE DRAWINGS

The invention is explained in more detail below with reference to an exemplary embodiment. In the drawing.

DETAILED DESCRIPTION OF EXAMPLE EMBODIMENTS

Figure 1:
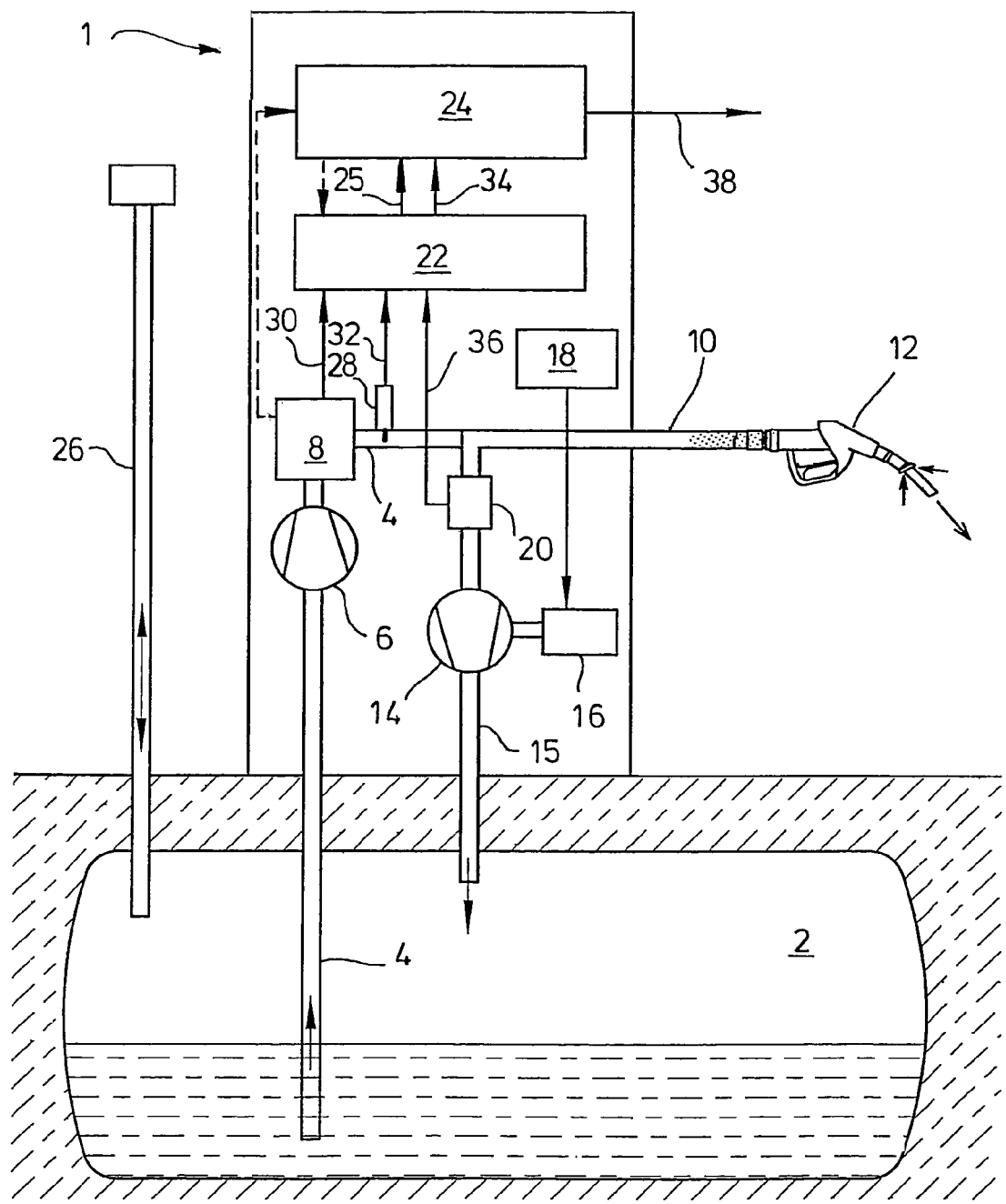
FIG. 1 shows a diagrammatic view of a gas recirculation system at a filling station with the components used for carrying out the method according to the invention.

A filling column 1 at a filling station, with the most important parts arranged in it or assigned to the filling column 1, including the components of a gas recirculation system, is illustrated diagrammatically in FIG. 1.

When the filling column 1 is in operation, fuel passes out of an underground storage tank 2 via a fuel line 4 and, conveyed by a fuel pump 6, through a fuel throughflow meter 8 and a filling hose 10 to a filling valve 12, from which the fuel is introduced into the tank of a motor vehicle, as indicated by the large arrow. At the same time, the fuel vapours (gas) standing above the liquid fuel in the tank of the motor vehicle are suction-extracted, this being indicated by the two small arrows at the filling valve 12. These gases are sucked up by a gas pump 14 via a separate line led inside the filling hose 10 and pass through the gas line 15 back into the storage tank 2. The gas pump 14 is driven by a drive motor 16 which has its own control electronics 18. A gas throughflow meter 20 serves for determining the gas volume flow.

In gas recirculation systems of the type explained, the gas volume flow has to be adapted to the fuel volume flow. In simple systems, the signals (counting pulses) from the fuel throughflow meter 8 are fed to a filling-column computer (as depicted in FIG. 1 as a left-hand dashed line) which correspondingly activates the control electronics 18, so that the volume conveying rate of the gas pump 14 coincides as far as possible with that of the fuel pump 6. However, systems of this type cannot react to faults in the conveyance of gas.

Nowadays, therefore, the volume conveying rate of the gas pump 14 is monitored. For this purpose, a monitoring unit 22, which is connected to the filling-column computer 24, is provided in the filling column 1. In conventional systems, the filling-column computer 24 receives the signals from the fuel throughflow meter 8 and transmits them to the monitoring unit 22, as indicated in FIG. 1 by the dashed connections, and also to the control electronics 18. The signal from the gas throughflow meter 20 is received directly by the monitoring unit 22 which compares and evaluates the signals from the fuel throughflow meter 8 and from the gas throughflow meter 20 and transmits status signals 25 to the filling-column computer 24. These status signals are transferred from the filling-column computer 24 via a line 38 to a till computer and are displayed there (not illustrated).

The storage tank 2 is aerated or deaerated via a ventilation mast 26.

The parts and components explained belong thus far to a filling column having a conventional gas recirculation system with a monitoring of the gas recirculation.

FIG. 1 shows, as an additional component, a temperature sensor 28 which is arranged next to the fuel throughflow meter 8 on the fuel line 4 and which detects the temperature of the fuel flowing through the fuel line 4. The signal from the temperature sensor 28 is sent to an input of the monitoring unit 22, so that a temperature correction can be carried out on the measured fuel volume, as explained below. Furthermore, the signals from the fuel throughflow meter 8 are fed directly to the monitoring unit 22, and therefore the connections depicted by dashes in FIG. 1 are dispensed with.

When fuel flows through the fuel throughflow meter 8, the fuel throughflow meter 8 therefore transmits to an input of the monitoring unit 22 fuel pulses 30 which are characteristic of the conveyed fuel volume. At the same time, a temperature signal 32 arrives at the monitoring unit 22. The monitoring unit 22 calculates a temperature-corrected volume from this. In the exemplary embodiment, this takes place in that the measured volume is multiplied by the quotient of the density of the fuel by the temperature measured by the temperature sensor 28 and the density of the fuel at a predetermined temperature. If, for example, the temperature measured by the temperature sensors 28 is higher than the predetermined temperature, the measured volume must be corrected downwards, since, in this case, the fuel has a lower density, so that the fuel quantity (that is to say, fuel mass) actually conveyed to the motor vehicle is lower. If, for example, each fuel pulse 30 corresponds to a specific volume, according to the formula explained the monitoring unit 22 reduces the number of temperature-corrected fuel pulses 34 transferred to the filling-column computer 24. If, in this case, the individual temperature-corrected fuel pulses 34 are transmitted somewhat more slowly than the uncorrected fuel pulses 30 are received, the filling-column computer displays a corrected fuel volume directly. Although, in the example, this volume is lower than the volume actually introduced, it is, instead, proportional to the fuel mass introduced.

The arrangement according to FIG. 1 also allows a further correction. For this purpose, the monitoring unit 22 evaluates the gas throughflow signal 36 transmitted by the gas throughflow meter 20, for example in that the mass of the fuel recirculated into the storage tank 2 is calculated from the measured gas volume flow and the outside temperature and, by means of known density values for liquid fuel, is converted into a volume for liquid fuel which is subtracted from the temperature-corrected fuel volume. The conversion into corrected fuel pulses which are transferred to the filling-column computer 24 may take place in the same way as described above in connection with the temperature correction.

The filling-column computer 24 displays the corrected volume directly on the filling column 1 and additionally transmits the corresponding data to a till computer via the line 38.

I claim:

1. A method for detecting fuel quantity during refueling of a motor vehicle, the method comprising:
    measuring a volume of fuel conducted to a motor vehicle during a refueling operation,
    measuring a temperature of the fuel, and
    correcting the measured volume to predetermined temperature conditions by means of the measured temperature, the correcting being carried out in a monitoring unit for a gas recirculation system,
    wherein the monitoring unit corrects the measured volume of the fuel additionally according to a gas quantity suction-extracted from the motor vehicle during the refueling operation.

2. The method according to claim 1, wherein, during the correcting, the measured volume is multiplied by a quotient of a density of the fuel at the measured temperature and a density of the fuel at the predetermined temperature.

3. The method according to claim 1, wherein the predetermined temperature conditions comprise temperature conditions on which pricing is based.

4. The method according to claim 1, wherein the monitoring unit is connected to a filling-column computer and transmits to the filling-column computer fuel-volume pulses which are characteristic of the corrected volume.

5. The method according to claim 1, wherein the correcting is carried out continuously during the refueling operation.

6. The method according to claim 1, wherein the temperature of the fuel is measured in or on a fuel line.

7. The method according to claim 6, wherein the fuel line is arranged inside a filling column.

8. A device for carrying out the method according to claim 1.

9. The device according to claim 8, comprising a temperature sensor arranged to sense the temperature of the fuel and an interface for interfacing the temperature sensor to the monitoring unit.

10. A retrofitting kit for a gas recirculating system which includes a monitoring unit, the retrofitting kit comprising:
   a temperature sensor for sensing a fuel temperature of fuel delivered to a tank during a fueling operation; and
   a monitoring unit upgrade for upgrading the monitoring unit of the gas recirculating system so that the monitoring unit corrects a measured fuel volume based on a temperature sensed by the temperature sensor and on a gas quantity suction-extracted from the tank during the fueling operation.

11. The retrofitting kit according to claim 10, wherein the monitoring unit upgrade comprises one or both of a software upgrade and a firmware upgrade.

12. A method for detecting fuel quantity, the method comprising:
   receiving a measurement of a volume of fuel delivered to a tank during a fueling operation, and
   correcting the volume measurement based on a quantity of gas that is suction-extracted from the tank during the fueling operation.

13. A device configured to carry out the method according to claim 12.

14. The method according to claim 12, further comprising:
   receiving a measurement of a temperature of the fuel; and
   further correcting the volume measurement based on the temperature measurement.

15. The method according to claim 14, wherein the correcting of the volume measurement based on the temperature measurement comprises correcting the volume measurement based on a relationship between the temperature measurement and specified temperature conditions.

16. The method according to claim 15, wherein the specified temperature conditions comprise temperature conditions on which pricing of the fuel is based.

17. A system comprising:
   a volume flowmeter for measuring a volume of fuel delivered to a tank during a fueling operation; and
   a processing system for correcting the measured volume of fuel based on a quantity of gas that is suction-extracted from the tank during the fueling operation.

18. The system according to claim 17, further comprising:
   a temperature sensor for sensing a temperature of the fuel,
   wherein the processing system further corrects the measured volume based on the temperature sensed by the temperature sensor.

19. The system according to claim 17, further comprising:
   a display for displaying the corrected measured fuel volume.

* * * * *